United States Patent Office 3,333,349
Patented Aug. 1, 1967

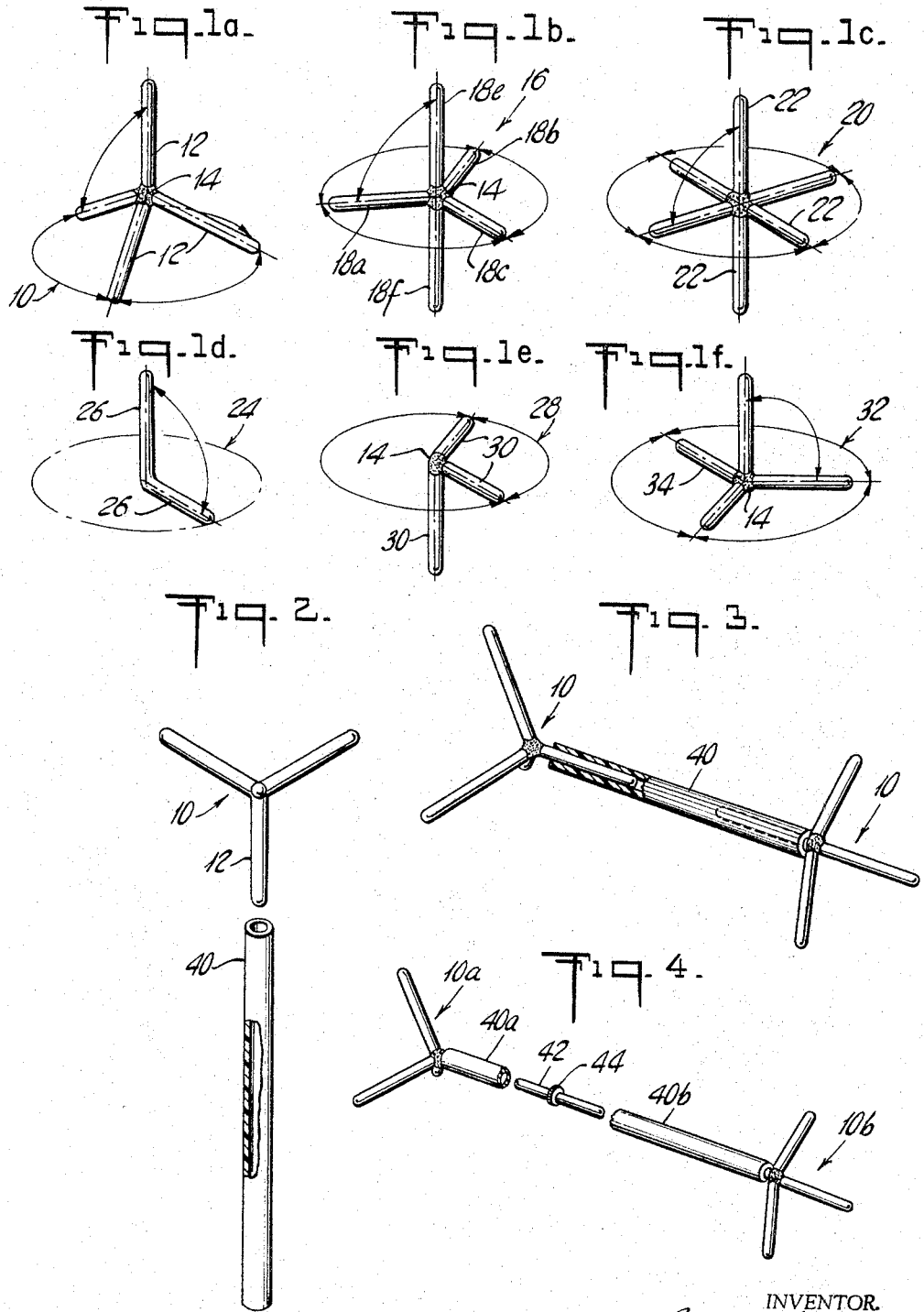

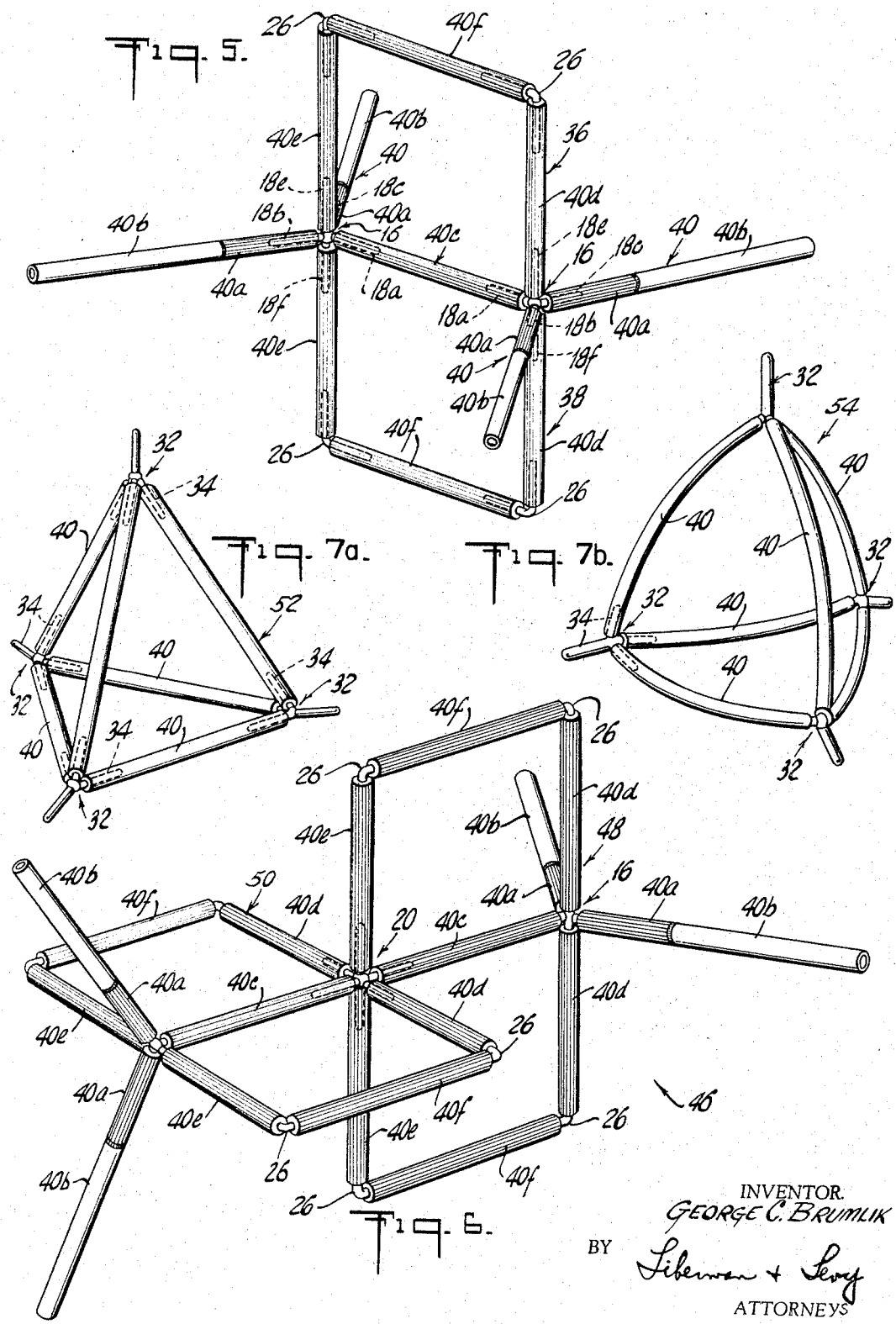

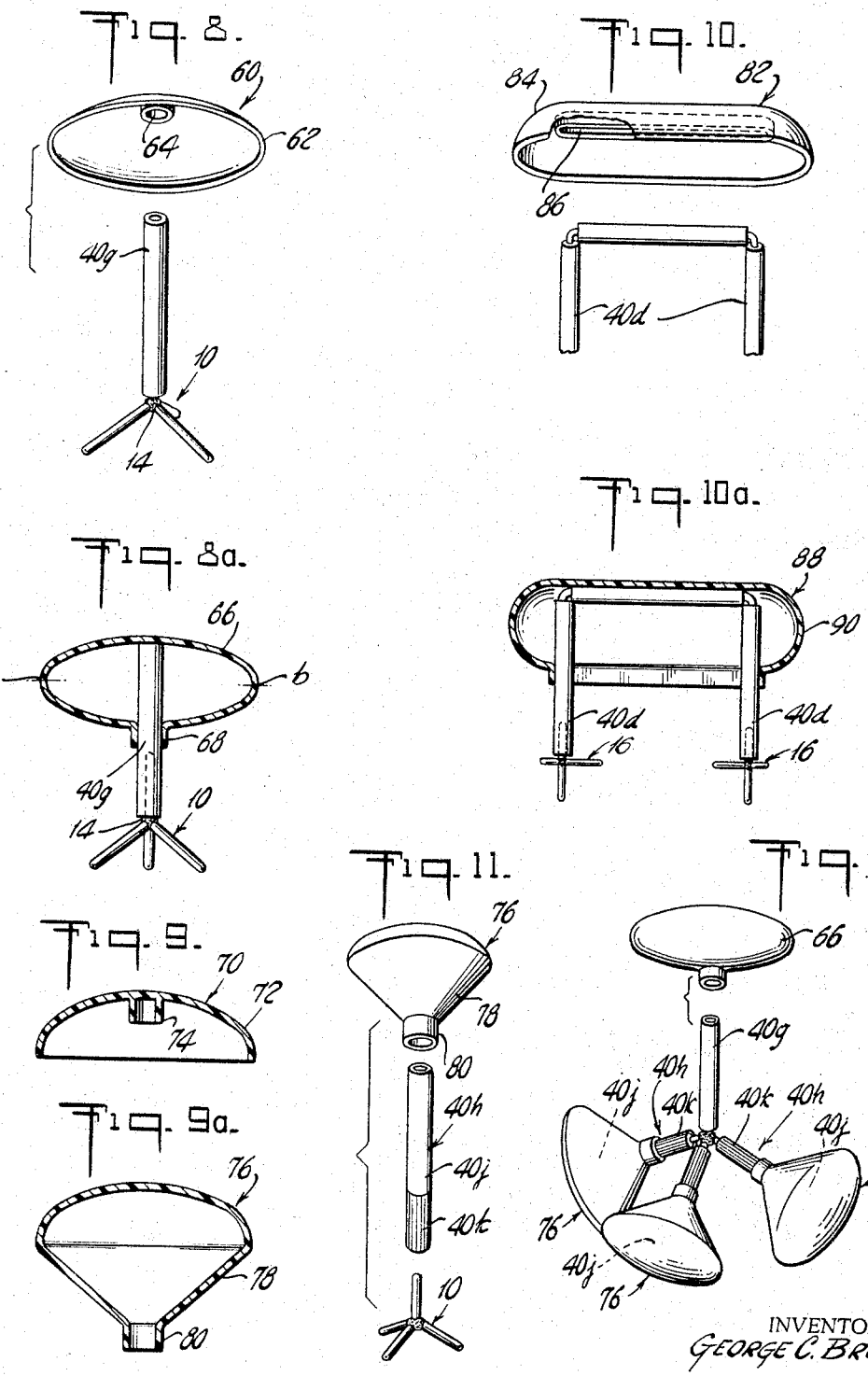

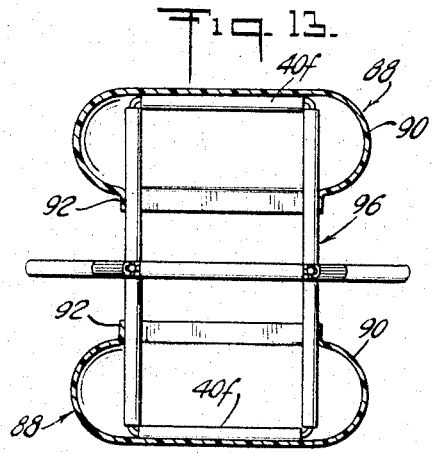
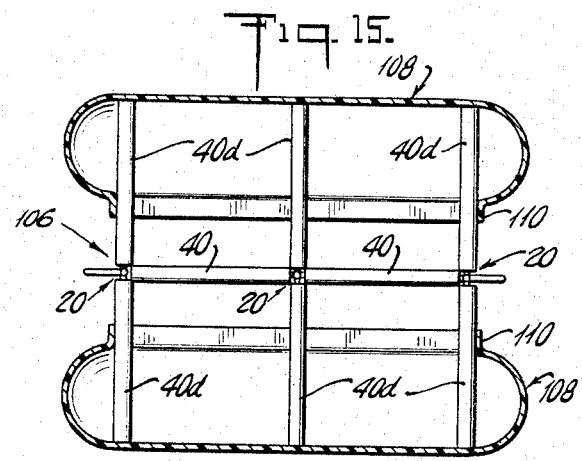
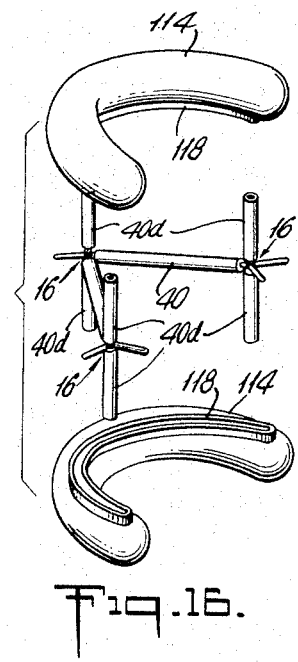
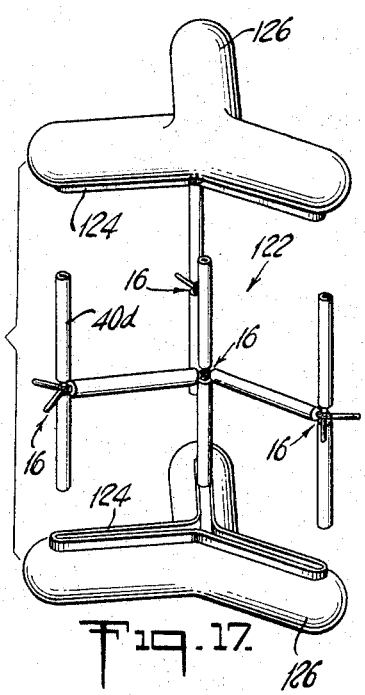
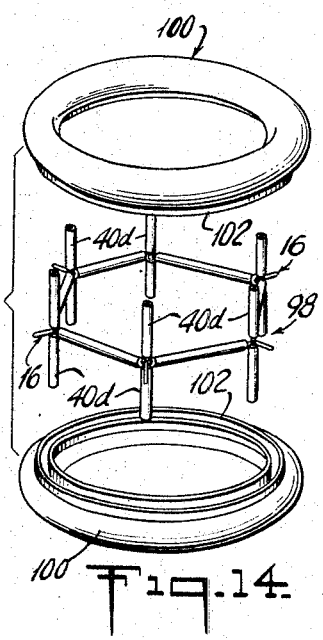
INVENTOR.
GEORGE C. BRUMLIK
BY Lieberman + Levy
ATTORNEYS ns

3,333,349
FRAMEWORK MOLECULAR ORBITAL MODEL ASSEMBLY
George C. Brumlik, 331 E. 71st St., New York, N.Y. 10021
Filed Apr. 1, 1964, Ser. No. 356,546
11 Claims. (Cl. 35—18)

The present invention relates to models employed for representing atomic and molecular structure, and in particular relates to a novel and improved model for representing the physical and geometric relationships of molecular and atomic orbitals.

According to the modern theories of valence and molecular orbitals, supported by physical and chemical evidence, atomic and molecular orbitals have characteristic shapes, volumes, and spacial orientation. The nature of the transition state in chemical reactions is also determined by the geometry of the participating molecular orbitals. In accordance with these theories, a fully saturated atom (i.e. an atom which is bonded to other atoms only by sigma bonds, and which carries no unshared electron pairs) is spherical and its radius is called the covalent radius. If the atom is not fully saturated, electronic orbital lobes are found to rise on the surface of the covalent core and to extend in definite geometric patterns far beyond the covalent core of the atom. These lobes are traced by unshared electron pairs, a lone electron, or by electrons which form polynuclear pi orbitals. The sigma bond orbitals, located mainly between the atoms which they unite, do not contribute to the molecular volume aside from their effect upon the size of the covalent core of the atom.

In molecules, an atom can take a number of geometric forms and its volume can vary greatly, depending upon the molecule of which it is part. Both the shape and the size of an atom depend upon the state of its hybridization and also upon the number of unshared electron pair orbitals that the atom carries. The orbitals which contribute to the atomic volume over and above the volume of the saturated atomic core are here termed as "space-filling orbitals." A satisfactory model set depicting atoms and molecules according to the valence and molecular orbital theories should be capable of representing all of these variables in accurate scale.

In my prior United States Patent No. 3,080,662, issued Mar. 12, 1963, I have disclosed molecular models which explicitly include molecular and atomic orbitals, their relative shapes and exact physical interrelationships. In the aforesaid patent, the molecular and atomic orbitals, as well as the atoms and the molecules in themselves, are made in a 3-dimensional solid form, approximating the actual shape of the molecular geometry. Some of the components of the set, for example, are of solid spherical shape, while others are ellipso-conical, frusto-conical, etc. Such solid components when fitted together to form the completed model, fit closely together and provide a mass of solid model which can be referred to as a "space-filling" molecular model. Such models have the advantage of depicting very closely the true molecular shape and geometry, but have the disadvantage of providing such a bulky outer configuration that it is difficult to observe the inner structural details of the model.

It is an object of the present invention to provide molecular orbital models having a framework construction which outlines the orientation of the symmetry axes and the symmetry planes of atomic and molecular orbitals in three dimensions and illustrate on a relative scale the extent to which these orbitals reach out into molecular space.

Another object of the present invention is the provision of a molecular model set consisting of inter-fitting components which are assembled to meet the requirements of accurate representation of the largest variety of molecules in all their possible detail, and yet achieve this with only a few components and with such an open framework configuration that both inner and outer molecular parameters can be readily viewed.

Another object of the invention is the provision of a molecular model set of the character described in which the components include elongated tubular members inter-connected by angular couplings so arranged that the bond angles may be selectively varied and the distances between atoms and the relative sizes of the atoms can be properly and accurately depicted.

A further object of the invention is the provision of a molecular model set, the components of which constitute few simple parts which are easily and economically manufactured so that the set may be marketed at a price which is accessible to students and the like.

In accordance with the invention there is provided a molecular model assembly including a plurality of coupling units representing valence clusters and having arm sections angularly arranged to represent the symmetry axes of atomic valence orbitals and bond angles. The arm sections are sized to receive and frictionally retain sections of tubing colored to represent various atoms, and of such selected lengths as to depict accurately and to scale the sigma bond distances between bonded atoms, as well as the Van der Waals radii of unshared electron pair orbitals, pi orbitals, etc. The coupling units and tubing sections are coupled to provide accurate framework models of molecules, and the assembly may also include space-filling members adapted to be mounted on the framework and sized and shaped to represent Van der Waals envelopes of unshared electron pair orbitals, pi orbitals and polynuclear pi orbitals.

Additional objects and advantages of the invention will become apparent during the course of the following specification when taken in connection with the accompanying drawings, in which:

FIGS. 1a through 1f are isometric views of the various coupling units which may be used in a molecular model set of the present invention;

FIG. 2 is an exploded view showing the manner in which one of the coupling units is fitted within the end of a tubular component;

FIG. 3 is an elevational view, with a portion broken away, showing the components of FIG. 2 in assembled condition;

FIG. 4 is an exploded elevational view, with portions broken away, of a pair of coupling elements assembled with a tubular component formed of two parts and assembled together by a connecting element;

FIG. 5 is an isometric view of an assembled model depicting the framework of an ethylene molecule;

FIG. 6 is an isometric view of an assembled model depicting the framework of an allene molecule;

FIG. 7a is an isometric view of an assembled model depicting the framework of a yellow phosphorous molecule;

FIG. 7b is an isometric view of the same molecular model shown in FIG. 7a, but in which the components thereof are bowed to depict bent bonds;

FIG. 8 is an exploded isometric view of a portion of a model of an atom, incorporating a space-filling member depicting an unshared electron pair orbital;

FIG. 8a is an elevational view of an assembled portion of a model similar to FIG. 8, but incorporating a modified form of space-filling member to depict an unshared electron pair orbital, the latter member being shown in section;

FIGS. 9 and 9a are sectional views of alternate forms of space-filling members, each depicting the Van der Waals envelope of a univalent atom;

FIG. 10 is an exploded perspective view of a model portion representing a pair of atoms and including a space-filling member depicting the pi orbital lobe thereof;

FIG. 10a is a sectional view of a model portion, similar to FIG. 10, but including an alternate form of space-filling member depicting the pi orbital lobe;

FIG. 11 is an exploded view of a model section showing the manner in which the space-filling member of FIG. 9a is assembled with a representation of bonded atoms to depict the Van der Waals envelope of one of the atoms;

FIG. 12 is a perspective, partially exploded view of an assembled model representing an ammonia molecule;

FIG. 13 is a sectional view of an assembled model portion utilizing a pair of space-filling members to depict the presence of both lobes of the pi orbital;

FIG. 14 is an exploded perspective view showing the framework and space-filling members which are assembled to represent polynuclear pi orbitals of the O ring type;

FIG. 15 is a sectional view of an assembled portion of a model representing an I type polynuclear pi orbital;

FIG. 16 is an exploded perspective view showing the framework and space-filling members which are assembled to form a model portion representing a C polynuclear pi orbital; and FIG. 17 is an exploded perspective view of the framework and space-filling members which are assembled to form a model of a nitrate ion having a Y type polynuclear pi orbital.

Referring in detail to the drawings, and particularly to FIG. 1, there is shown a series of coupling elements which may be employed as components of the molecular model sets made in accordance with the invention. These coupling elements are intended to represent valence clusters and consist of thin cylindrical elements meeting together at a center point which constitutes the center of the atom. The cylindrical elements generally point along the symmetry axes of the atomic valence orbitals, and the angles at which these sections are disposed accurately represent bond angles in the assembled molecular models. In its preferred form, the valence clusters are formed of metal arm sections of small diameter, joined end-on at a common point representing the center of the atom. These valence clusters hold their shape even when they are used for the construction of strained models, as will be later described, yet their angles can be adjusted by bending them by means of long pieces of tubing used as lever arms.

In FIG. 1a are shown four wire sections 12 all connected at one end at a common center 14 to form a tetrahedron. In this form, the angles between the sections are respectively 109°.

In FIG. 1b, a coupling member 16 formed of five sections 18 is shown. The sections 18 again meet at a common center point 14, and in this instance are arranged in a trigonal bipyramid pattern. In this embodiment, three of the elements, 18a, 18b and 18c extend radially from the center point 14 in a circular plane perpendicular to the other two sections 18e and 18f, with the angle between any two adjacent sections 18a, 18b and 18c being 120°, and the angle between the two sections 18e and 18f and any of the three other sections being 90°.

In FIG. 1c there is shown a coupling element 20 composed of six sections 22 meeting at a common center point 14 and arranged in an octahedral pattern. The angle between any two adjacent sections 22, in this embodiment, is 90°.

In FIG. 1d, the coupling element 24 is formed of only two sections 26 connected at their ends to form a right angle. This element 24 may be made by cutting away the excess sections from the elements 16 or 20. In FIG. 1e, a coupling element 28 is formed by three sections 30 connected at their ends at center point 14 to form a part of the trigonal bipyramid defined by the coupling 16 of FIG. 1b and wherein the arm sections 18a and 18f of coupling 16 are removed. Similarly, the coupling 32 shown in FIG. 1f, and constituting four sections 34 connected at center 14, represents the coupling 16 of FIG. 1b with the lower depending vertical section 18f removed.

It will thus be seen that the couplings representing the valence clusters constitute the three basic forms shown in FIGS. 1a, 1b, and 1c, but that selected arm sections of these forms may be removed to form the three additional configurations shown in FIGS. 1d, 1e and 1f.

As was previously indicated, the coupling elements represent valence clusters which include the center of the atom with the arm sections thereof representing the orientation of the atomic valence orbitals in space. The atoms are then interconnected by means of sections of tubing 40 to depict selected molecules. The tubing sections 40, as shown in FIGS. 2, 3 and 4, are preferably elastomeric plastic extrusions, and are of a size to frictionally receive and retain the arm sections of the coupling elements or valence clusters. The tubing is made of precisely selected lengths to a selected scale, preferably within the range of 5 mm./angstrom unit to 100 mm./angstrom unit, to accurately represent the bond distance between atoms. Colored plastic is used for atom coding, for example, black to depict carbon, white to depict hydrogen, red for oxygen, blue for nitrogen, yellow for sulphur, etc. To illustrate, with a coupling unit 10 inserted in each of the ends of a black tubing section 40, as shown in FIG. 3, the model depicted represents two bonded carbon atoms with the tubing 40 accurately measuring the sigma bond distance between such bonded atoms.

In the case where the molecule is to depict the bonding of two atoms representing different elements, the tubing 40 is provided in different colors to illustrate visually the covalent radii of the atoms constituting the bond. In the situation depicted in FIG. 4, for example, two different atoms are shown ready to be bonded. The length of tubing 40a mounted on the coupling unit or atom cluster 10a and depicting the covalent radius thereof, is made of a short length to accurately depict the relative size of such covalent radius and is provided with a selected color to identify the particular atom. On the other hand, the tubing 40b mounted on the coupling unit or atomic cluster 10b is made of a different color to indicate that its corresponding atom 10b is of a different element than that represented by the atomic cluster 10a, and is also made longer to accurately depict the length of the covalent radius of the atom of the cluster 10b. The tubing sections 40a and 40b are connected at their free ends by a coupling pin 42 having at its center a separator 44 of enlarged diameter to prevent the pin 42 from sliding entirely into the interior of either of the tube sections.

FIG. 5 illustrates an assembly made from the coupling elements and tube sections previously described and intended to represent a molecule of ethylene with its associated orbitals. In this view, two of the coupling units 16 of FIG. 1b, and representing trigonal bipyramids, are employed centrally of the model to represent the hybridization of two carbon atoms of the ethylene molecule. To the two projecting sections 18b and 18c of each of the coupling units 16 are mounted respective joined tubular sections 40 in which the short inner tubular section 40a is colored black to represent the characteristic code coloration of the carbon atom and to indicate the covalent radius thereof, and the outer section 40b is colored white to represent a hydrogen atom bonded to the said carbon atom. The length of the tube section 40b is proportioned to accurately represent the length of the Van der Waals radius, or more accurately, the total length of the joined tubing section 40 is selected to equal the sum of the covalent radius of hydrogen toward the carbon atom and the Van der Waals radius away from the carbon atom.

The two aligned and facing arm sections 18a of the coupling units 16 are connected by a length of tubing section 40c which represents the internuclear distance between the carbon atoms represented by the coupling units 16. This section 40c is also colored with the characteristic black color of the carbon atoms.

The coupling units 16 carry oppositely-directed and upstanding and depending frame sections 36 and 38 of U-shaped configuration and formed by parallel tube sections 40d and 40e mounted on the respective arm sections 18e and 18f of the coupling elements 16. The free ends of the tube sections 40d and 40e are connected by the coupling elements 24, shown in FIG. 1d, to a cross tube section 40f. The length or outer projection of the frame members 36 and 38 is selected to accurately represent the Van der Waals diameter of the molecule at the pi bonds of the molecule between the carbon atoms represented by the coupling members 16 and the coupling members 20. The tube sections constituting the frames 36 and 38 are also colored with the characteristic black color of the carbon atoms.

FIG. 6 shows the manner in which two or more of the rectangular frames shown in FIG. 5 may be combined to construct a model 46 depicting more complicated molecular structure. In this view, two of the rectangular frames 48 and 50 formed of the tube sections 40c, 40d, 40e and 40f, with a pair of their carbon-hydrogen covalent radius sections 40a, 40b, are coupled together in perpendicular planes by utilizing a coupling element 24 of the type shown in FIG. 1d to connect the two rectangular frames at their juncture. This model represents a molecule of allene, and the pair of perpendicular frames 48, 50 of the two adjacent pi bonds suggests the absence of conjugation. In a space-filling model the central carbon atom 20 would not be visible.

The assembly of accurate models of molecules having unusual bond angles (angles other than the common 90°, 109°, 120° and 180°) has been difficult if not impossible using available model sets. The model set of the present invention has eliminated this problem due to the bendable nature of the arms of the atomic cluster units and also due to the elastomeric nature of the tubing. FIG. 7a, for example, shows a model 52 representing a molecule of yellow phosphorus. The model utilizes four of the coupling elements 10 shown in FIG. 1a and depicting phosphorous atoms. Three of the arms 12 of these elements are bent, however, to form included angles of 60°, with the result that when appropriately colored sections of tubing 40 are inserted on the arms of the altered coupling units 10, the model includes surfaces of equilateral triangles.

FIG. 7b also shows a model 54 of a molecule of yellow phosphorous formed in a different manner. Here again, four of the coupling elements 10 are utilized, but the arms 12 thereof are left unbent. When the tubing sections 40 are inserted to connect the atomic cluster elements 10, they flex and take the bent shapes shown in FIG. 7b. This model may be referred to as a "strained" system, and the curved flexible tubing represents bent bonds. The distorted clusters or bent tubing used in models of FIGS. 7a and 7b can be used to represent the structure of small rings, rings containing hetero-atoms, and models of acyclic molecules with distorted bond angles.

FIGS. 8–17 show various space-filling units which may be used with the framework parts previously described to depict actual geometric shapes of univalent atoms, unshared electron pairs and pi orbitals which are impossible to reproduce in a skeletal model. FIG. 8, for example, illustrates an oblate elliptical member 60 representing an unshared electron pair orbital. The member 60 is preferably molded of a semi-rigid plastic such as polyethylene, and its open body 62 is formed at its central inner surface with a tube 64 sized to be received upon a tubing section 40g mounted upon one of the coupling members, for example, the coupling member 10. The tubing section 40g is sized to represent the Van der Waals' radius which manifests itself in the presence of an unshared electron pair. When the tubing section 40g is inserted fully within the tube 64 of member 60, its end engages the inner surface of the body 62. The Van der Waals envelope of the atom is represented by the outer surface of the body 62 and is thus spaced an accurate scaled distance from the center 14 of the atom 10. This represents the relative nonbonded radius of the atom in the direction of the unshared electron pair.

FIG. 8a illustrates an alternative form of the unshared electron pair orbital, represented by hollow member 66 molded in oblate ellipsoidal form with a tube 68 centrally located at its lower surface. When assembled on the tubing section 40g mounted on element 10, the tubing section 40g extends through the tube 68 and through the hollow interior of the member 66, abutting the inner surface thereof. The Van der Waals envelope is represented by the actual outer surface of member 66 between points $a$ and $b$, and is accurately spaced the same distance above the center 14 of atom 10, as in the previous embodiment.

The space-filling members 60 and 66 are given the same color coding as the atom which they represent and as depicted by the tubing section 40g. For example, if the section 40g is colored red to represent oxygen, the members 60 or 66 representing the Van der Waals envelope for that atom would also be colored red.

Space-filling members of the same general type may be employed to depict univalent atoms where covalent radii as well as Van der Waals envelopes are to be shown. FIG. 9 illustrates such a model, illustrating the Van der Waals envelope of a univalent atom. The space-filling member 70 has a body 72 of the same general type as the body 62 of member 60 shown in FIG. 8, but is of slightly different configuration, representing a scale configuration of the Van der Waals envelope of a univalent bonded atom in the non-bonded direction. The curvature formed at the outer surface of the member 70 is therefore different from that formed by member 60. The body 72 is formed with a small tube 74 at its central inner surface, capable of receiving and frictionally retaining a section of tubing as previously described.

FIG. 9a shows an alternative form of space-filling member 76 also representing the Van der Waals envelope of a univalent bonded atom, but having a body 78 molded in hollow form similar to the member 66 shown in FIG. 8a. The body 78 is of ellipsoconical shape and has a central tubular opening 80 at its lower end.

FIG. 11 shows the member 76 in the manner in which it would be assembled with a tubular section 40h mounted on an atomic cluster 10. The tubular section 40h is formed of a section 40j color coded to represent a univalent atom such as hydrogen, and a second section 40k colored to represent a different, multivalent atom such as oxygen. When the body 78 is inserted on the tubing section 40h until the end of portion 40j abuts the inner surface of the body 78, the lower end of tube 80 is located at the junction between tube portions 40j and 40k. The outer surface of the body 78 represents the Van der Waals envelope of the hydrogen atom, the center of which is spaced a short distance above said junction. The covalent radius of the oxygen atom is visible and is, of course, represented by the tubing portion 40k.

FIG. 10 illustrates a space-filling member 82 which represents the geometry of a pi orbital lobe. The member 82 has a body 84 shaped as the half-section of a prolate ellipsoid and having an elongated flange 86 on its inner surface. The flange 86 is adapted to receive a pair of tubular sections 40d representing to scale the Van der Waals radius at the pi orbital. Each of the tubular sections 40d is mounted on an atomic cluster 16. In the assembled position, the outer surfaces of the tubular sections 40d engage the inner surface of the body 84 to portray the accurate geometry of the pi orbital in the non-bonded direction. In actual practice, a pair of these assemblies would be constructed upon the atomic clusters 16, one above and the other below the symmetry plane of the molecule, to represent three dimensional geometry of pi bonds.

FIG. 10a shows an alternate form of pi orbital 88 similar to that of FIG. 10 but molded in the form of a hollow body 90 of complete prolate ellipsoid form and having a flanged slot 92 at its lower surface. The tubular sections 40d are inserted through opposite ends of the slot 92 in the manner shown until both engage the upper inner surface of body 90. The pi orbital depiction is the same as that previously described in connection with FIG. 10.

FIG. 12 illustrates a space-filling model of an ammonia molecule utilizing the space-filling bodies 76 shown in FIG. 9a, as well as the space-filling body 66 shown in FIG. 8a. On the coupling member or atom cluster 10 are mounted three tubing sections 40h having a lower portion 40k colored to represent an atom of nitrogen, and an upper portion 40j colored to represent an atom of hydrogen. On each of the tubing section 40h, a space-filling body 76, colored to represent hydrogen, is mounted in the manner previously described. On the fourth arm of the cluster 10 is mounted a tubing section 40g of the type shown in FIG. 8, colored to represent nitrogen and carrying a space-filling body 66 of the type shown in FIG. 8a. The tubing section 40g and the body 66 represent geometric characteristics of the unshared electron pair, while the three tubing sections 40j and the corresponding space-filling bodies 76 characterize the stereo-chemical properties of the hydrogen atoms. The combined outermost surfaces of the bodies 66 and 76 trace out the Van der Waals envelope of the ammonia molecule in accurate scale.

FIG. 13 shows the manner in which the space-filling elements 82 and 88 are combined with framework assemblies to indicate the presence of pi orbitals. The framework 96 in FIG. 13 depicts an ethylene molecule, similar to that shown in FIG. 5. The space-filling members 88 are of identical size and shape, and, as previously described, each constitutes a hollow body 90 in the shape of a flattened prolate ellipsoid, having an elongated central flanged slot 92 sized to receive and snugly retain the central portion of the frame 96 as shown. In the assembled condition of FIG. 13, the frame sections 40f engage the inner surfaces of the respective bodies 90 of members 88, so that the outer surfaces of the latter, depicting the Van der Waals envelopes of the molecule in the direction of the pi orbital, are accurately located relative to the molecular frame.

Polynuclear pi orbitals consist of two double streamers formed by the overlap of two or more pi atomic orbital lobes which lie above and below the symmetry plane of the molecule. This geometry enables the pi bonds to overlap with neighboring pi bonds or unshared pair orbitals to form large polynuclear orbitals. These pi orbitals occupy a considerable fraction of molecular space, and their space-filling geometry can be shown in the models of the present invention. In nature, these pi orbitals assume a number of characteristic shapes, the most common of which resemble the alphabetical letters O, C, Y, and I.

FIG. 14 shows the model parts which can be assembled to depict an aromatic pi orbital such as exists in a benzene ring. The skeletal or framework structure 98 is composed of six atom clusters or coupling members 16 connected by sections of tubing 40 representing sigma bonds, and having a hexagonal arrangement. The upstanding and depending arms 18e and 18f of the coupling members 16 carry tube sections 40d representing the Van der Waals radii of the carbon atoms in the direction of the pi orbital.

Space-filling members 100, both of hollow toroidal configuration, are mounted on the tube sections 40d by means of flanged annular slots 102 in the respective members 100 which snugly receive said tube sections. These two members 100 represent accurate depictions of polynuclear pi orbitals that close into a circle, and the outer surface of which constitutes the Van der Waals envelope.

FIG. 15 illustrates the manner in which the model set may be used to portray an I (linear) polynuclear pi orbital. The framework 106 is formed of three in-line atomic clusters represented by coupling members 20 connected together by tubular sections 40 and having tubular sections 40d mounted thereon in planes perpendicular to the axis of the framework. The space-filling members 108 are elongated and substantially cylindrical with rounded ends, having a straight slot 110 receiving the tubular sections 40d. The assembled model would represent one of the pi orbital systems in a molecule of carbon dioxide, with the members 108 again representing the Van der Waals radii of the carbon atoms in the direction of the pi orbital.

FIG. 16 shows space-filling members 114 shaped to represent a C (bent) pi orbital. In this instance, the framework 116 is made in angular form to depict a nitrite ion, using three coupling members 16 to signify the $sp^2$ hybridization of two oxygen atoms and one nitrogen atom. The 120° angles between the arms of the central coupling member 16, positions the coupling members in such a manner that the C-shaped slots 118 in the members 114 receive the tubular sections 40d representing the Van der Waals radii in the direction of the pi orbital.

FIG. 17 illustrates a framework 122 constructed to represent a nitrate ion composed of four coupling members 16 connected by tubing sections 40 representing sigma bonds, and arranged in the form of a Y. Each of the coupling members 16 carry upstanding and depending tube sections 40d which receive respective slots 124 in the space-filling members 126. The members 126 are formed to represent Y shaped pi orbitals.

It will thus be seen that the coupling units and their associated sections of tubing can be arranged to reproduce accurately the framework of any selected atom, ion or molecule, and the space-filling elements may be mounted thereon to give a true representation of Van der Waals envelopes, pi orbitals, and polynuclear pi orbitals, and unshared electron pair orbitals.

While preferred embodiments of the present invention have been shown and described herein, it is obvious that numerous additions, changes and omissions may be made in such embodiments without departing from the spirit and scope of the invention. For example, as an equivalent structure, it will be appreciated that the atomic clusters or coupling members may be molded of plastic in hollow tubular form, and solid metal or plastic pins may be used instead of the tubular sections to connect the hollow atom clusters.

What is claimed is:

1. A molecular model assembly comprising a plurality of coupling units each representing the center and the directed valence orbitals of a single atom, and each having arm sections angularly arranged in accordance with the symmetry axes of valence orbitals and bond angles of the atom to be depicted by said coupling unit, and a plurality of elongated cylindrical sections each sized for frictional mounting at each end on respective arm sections of said coupling units with the mounted end thereof abutting the juncture of said arm sections at the center of said coupling unit, said cylindrical sections being respectively sized to represent accurately to scale the sigma bond distances between bonded atoms represented by the centers of said coupling units, and the Van der Waals radii of unshared electron pair orbitals, pi orbitals and polynuclear pi orbitals, said cylindrical sections being color coded respectively to depict atoms of selected elements corresponding to the coupling units on which said cylindrical sections are mounted, said coupling units and cylindrical sections being thus capable of being coupled to form an accurate framework model of a selected molecule including accurate scale representations of bond angles, bond distances, covalent radii, and Van der Waals radii.

2. A molecular model assembly comprising a plurality of coupling units each representing the center and the directed valence orbitals of a single atom, and each having arm sections angularly arranged in accordance with the symmetry axes of valence orbitals and bond angles of the atom to be depicted by said coupling unit, said coupling units being of three types, respectively defining a tetrahedron, a trigonal bipyramid and an octahedron, and a plurality of elongated cylindrical sections each sized for frictional mounting at each end on respective arm sections of said coupling units with the mounted end thereof abutting the juncture of said arm sections at the center of said coupling unit, said cylindrical sections being respectively sized to represent accurately to scale the sigma bond distances between bonded atoms represented by the centers of said coupling units, and the Van der Waals radii of unshared electron pair orbitals, pi orbitals and polynuclear pi orbitals, said cylindrical sections being color coded to depict respectively designated atoms corresponding to the coupling units on which said cylindrical sections are mounted, said coupling units and cylindrical sections being thus capable of being coupled to form an accurate framework model of a selected molecule including accurate scale representations of bond angles, bond distances, and Van der Waals radii.

3. A molecular model assembly according to claim 2 in which said cylindrical sections comprise lengths of hollowing tubing sized for receiving and frictionally retaining the arm sections of said valence clusters.

4. A molecular model assembly according to claim 2 in which at least one of said cylindrical sections is of a length to represent the accurate scaled distance between the centers of two sigma bonded atoms represented by coupling units connected to each end of said cylindrical section, each end of said cylindrical section being color coded to identify the atom depicted by the coupling unit thereon.

5. A molecular model assembly according to claim 2 in which at least one of said cylindrical sections is formed of two portions interconnected in axial alignment, each of said portions being color coded to represent respectively two different multivalent atoms, the relative lengths of said portions being proportioned to represent the covalent radii of said different atoms engaged in a sigma bond.

6. A molecular model assembly according to claim 2 in which at least one of said cylindrical sections is of a length representing accurately to scale the symmetry axis of an unshared electron pair orbital terminating at the Van der Waals radius of the atom associated with said section.

7. A molecular model assembly according to claim 2 in which at least one of said cylindrical sections is formed of two portions interconnected in axial alignment, each of said portions being color coded to represent respectively a multivalent atom and a univalent atom, the relative lengths of said portions being proportioned to represent the covalent radius of the univalent atom and the sum of the covalent and Van der Waals radii of the univalent atom.

8. A molecular model assembly according to claim 2 which at least some of said cylindrical sections are of a length representing accurately to scale the Van der Waals radius at the pi bond of a molecule incorporating said cylindrical sections.

9. A molecular model assembly comprising a plurality of coupling units representing valence clusters and each having arm sections angularly arranged in accordance with the symmetry axes of valence orbitals and bond angles of the atom to be depicted by said coupling unit, and a plurality of elongated cylindrical sections each sized for frictional mounting on and between respective arm sections of said coupling units to form a framework representing sigma bonded atoms and their internuclear distances, said framework also including a plurality of said cylindrical sections connected to said coupling units and arranged perpendicularly to the molecular plane and on both sides of the sigma bonded atoms thereof, the lengths of said perpendicular cylindrical sections representing accurately to scale the Van der Waals radius of the molecule at the pi bond, and members connecting the free ends of said perpendicular cylindrical sections to complete the framework of the pi bond, said connecting members comprising hollow space-filling members shaped to represent the electron clouds of the pi bond in three dimensional form.

10. A molecular model assembly according to claim 9 in which said framework is arranged to represent a polynuclear pi bond selected shape, and said space-filling members are formed to correspond with said shape, said space-filling members including means for the mounting thereon upon the free ends of said perpendicular cylindrical sections arranged in said selected shape.

11. A molecular model assembly for representing the orbital structure of atoms and molecules, said assembly comprising at least one coupling unit representing the center of a multivalent atom and having a plurality of rigid arms angularly arranged relative to each other to represent the directed valence orbitals of said atom, a cylindrical member mounted on one of said arms and representing the symmetry axis of an atomic orbital, the length of said cylindrical member representing accurately to scale the extension in space of said orbital, said cylindrical member being coded to identify the atom represented by said cylindrical member and the coupling unit upon which it is mounted, a hollow space-filling member including means for the releasable mounting thereof upon the free end of said cylindrical member, said space-filling member being sized and shaped to represent accurately to scale the unshared elecron pair orbital envelope of said atom in the non-bonded direction.

References Cited

UNITED STATES PATENTS

| | | | |
|---|---|---|---|
| 630,217 | 8/1899 | Hanstein | 35—34 X |
| 814,367 | 3/1906 | Given | 46—29 |
| 1,851,159 | 3/1932 | Dodge | 35—18 |
| 2,882,617 | 4/1959 | Godfrey | 35—18 |
| 3,080,662 | 3/1963 | Brumlik | 35—18 |
| 3,230,643 | 1/1966 | Mathus | 35—18 |

FOREIGN PATENTS

| | | |
|---|---|---|
| 479,746 | 12/1951 | Canada. |
| 1,236,929 | 6/1960 | France. |
| 826,115 | 12/1951 | Germany. |

LAWRENCE CHARLES, *Primary Examiner.*

EUGENE R. CAPOZIO, *Examiner.*

H. S. SKOGQUIST, *Assistant Examiner.*